(12) United States Patent
Kawano et al.

(10) Patent No.: US 8,482,813 B2
(45) Date of Patent: Jul. 9, 2013

(54) IMAGE-SCANNING DEVICE (75) Inventors: Hiroyuki Kawano, Tokyo (JP); Tatsuki Okamoto, Tokyo (JP); Tomotaka Katsura, Tokyo (JP); Junichi Nishimae, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 727 days.

(21) Appl. No.: 12/668,908

(22) PCT Filed: Mar. 26, 2008

(86) PCT No.: PCT/JP2008/055658
§ 371 (c)(1),
(2), (4) Date: Jan. 13, 2010

(87) PCT Pub. No.: WO2009/011153
PCT Pub. Date: Jan. 22, 2009

(65) Prior Publication Data
US 2010/0284045 A1     Nov. 11, 2010

(30) Foreign Application Priority Data
Jul. 13, 2007   (JP) ................................. 2007-183925

(51) Int. Cl.
*H04N 1/04*   (2006.01)
(52) U.S. Cl.
USPC ........... 358/474; 358/483; 358/482; 358/475; 358/505; 358/509; 358/514
(58) Field of Classification Search
None
See application file for complete search history.

(56) References Cited

U.S. PATENT DOCUMENTS

| | | | |
|---|---|---|---|
| 4,512,632 A | 4/1985 | Tokumitsu et al. | |
| 4,742,240 A | 5/1988 | Yamanishi et al. | |
| 5,444,520 A | 8/1995 | Murano | |

(Continued)

FOREIGN PATENT DOCUMENTS

| | | |
|---|---|---|
| EP | 0 676 890 A2 | 10/1995 |
| GB | 2 344 245 A | 5/2000 |

(Continued)

OTHER PUBLICATIONS

Extended European Search Report issued Jan. 24, 2012, in Patent Application No. 08738882.3.

(Continued)

*Primary Examiner* — Cheukfan Lee
(74) *Attorney, Agent, or Firm* — Oblon, Spivak, McClelland, Maier & Neustadt, L.L.P.

(57) ABSTRACT

An image-scanning device wherein plural images of an object are picked up inverted and reduced in size by image-forming optical systems arranged to be adjacent to each other, and then restored by an image processing system. Each optical system includes a first optical element having a first focal length; an aperture member located at a focus position in a rear side of the first optical element; and a second optical element provided in a rear side of the aperture member and having a second focal length shorter than the first focal length, respectively disposed from a side of the object being picked up to a side of the image pickup device. In between optical systems, corresponding image pick up devices thereof are arranged to be adjacent to each other, the image pickup devices including a region in which the images picked up by the image pickup devices are overlapped.

8 Claims, 8 Drawing Sheets

U.S. PATENT DOCUMENTS

| | | | |
|---|---|---|---|
| 5,489,995 | A | 2/1996 | Iso et al. |
| 5,907,438 | A | 5/1999 | Fujita et al. |
| 5,985,491 | A | 11/1999 | Kim et al. |
| 7,884,976 | B2 * | 2/2011 | Minobe et al. ............... 358/483 |
| 8,228,566 | B2 * | 7/2012 | Kawano et al. ............... 358/474 |
| 2005/0179962 | A1 | 8/2005 | Williamson |
| 2008/0225108 | A1 * | 9/2008 | Koizumi et al. ............. 347/244 |

FOREIGN PATENT DOCUMENTS

| | | |
|---|---|---|
| JP | 50-74948 | 6/1975 |
| JP | 56-146355 | 11/1981 |
| JP | 59-105762 | 6/1984 |
| JP | 60-74869 | 4/1985 |
| JP | 3 99576 | 4/1991 |
| JP | 4 138766 | 5/1992 |
| JP | 5 14600 | 1/1993 |
| JP | 5 224005 | 9/1993 |
| JP | 6 22086 | 1/1994 |
| JP | 8 204899 | 8/1996 |
| JP | 9 127319 | 5/1997 |
| JP | 9-247386 | 9/1997 |
| JP | 10 153751 | 6/1998 |
| JP | 10 308852 | 11/1998 |
| JP | 11 8742 | 1/1999 |
| JP | 2000-148995 | 5/2000 |
| JP | 2002 49326 | 2/2002 |
| JP | 2005-37448 | 2/2005 |

OTHER PUBLICATIONS

Japanese Office Action issued Nov. 8, 2011 in patent application 2010-505144.

International Search Report Issued Jul. 8, 2008 in PCT/JP2008/056301.

Office Action mailed Sep. 22, 2011, in co-pending U.S. Appl. No. 12/921,632.

Office Action issued Apr. 3, 2012, in Japanese Patent Application No. 2009-523560.

Office Action issued Dec. 4, 2012 in Japanese Application No. 2012-197069 (w/English translation).

* cited by examiner

| 102 | IMAGE-SCANNING DEVICE |
| 120, 121 | FOLDING MIRROR |

| 103 | IMAGE-SCANNING DEVICE |
| 125 | REFLECTIVE-TYPE APERTURE MEMBER ARRAY |
| 125a | OPENING |

Fig. 11

| | |
|---|---|
| 104 | IMAGE-SCANNING DEVICE |
| 123 | FIRST MIRROR LENS ARRAY |
| 124 | SECOND MIRROR LENS ARRAY |
| 129 | LIGHT-SHIELDING WALL |

Fig. 12

IMAGE-SCANNING DEVICE

TECHNICAL FIELD

The present invention relates to an image-scanning device used in copiers, and the like.

BACKGROUND ART

In image-scanning devices that are used in copiers, scanners, facsimiles, and the like, and that scan images at read positions using liner image pickup devices and thereby read the entire image, there are two main types of schemes. Note that generally a direction in which the one-dimensional image pickup devices are arranged is called a main scanning direction and a direction in which scanning is performed is called a sub-scanning direction.

One of the two types of schemes is a scheme in which the entire image in the main scanning direction is reduced in size and transferred onto the image pickup devices by a monocular lens, and is mainly used in copiers to read a front side. In this scheme, normally, the entire document is scanned such that the image pickup devices and the lens located on the document side are fixed and only mirrors are caused to move in the sub-scanning direction. This scheme has an advantage in that since a depth of focus (called a depth of field) on the document side is as large as the order of several mm, e.g., 6 mm, a document can be read even when the document is not in contact with a document reading surface of the copier. For example, even in the case where a document with a seam of a book or the like cannot be brought into contact with the document reading surface, there is an advantage of being able to read the document without going out of focus. Thus, this scheme is mainly used to read the front side of the document in copiers. There are various Patent Citations derived from this scheme but a Patent Citation 1, for example, is given as an example (hereinafter referred to as conventional method 1).

The other one of the two types of schemes is a scheme in which an image in the main scanning direction is divided into a plurality of images and the images are read by compound lenses, and is normally called a contact-type image pickup device. This scheme is used for reading a back side of the document in copiers, reading of documents in facsimiles, a bill recognition sensor, a scanner for a personal computer, and the like, and is characterized to be small in size. A conventional technique that is currently the mainstream of optical systems of the contact-type image pickup device is disclosed, for example, in a Patent Citation 2. The Patent Citation 2 discloses an image-scanning device that obtains an equal magnification erected image using, as compound lenses (referred to as a rod lens array in the Document), an array of a plurality of rod lenses, each of which has a refractive index profile in a radius direction thereof defined by a certain function (hereinafter referred to as conventional method 2).

As another example of representative schemes for optical systems of the contact-type image pickup device, there is one disclosed, for example, in a Patent Citation 3. In this scheme, by lenses mounted for respective cells divided in the main scanning direction, images in regions of the respective cells are reduced in size and transferred and then formed on image pickup devices. By combining output signals from the image pickup devices mounted for the respective cells, into images, images on a document surface are restored (hereinafter referred to as conventional method 3).

In addition, although not included in the above-described two representative schemes, a configuration using a reflecting mirror is disclosed in a Patent Citation 4. A document scanning device described in the Patent Citation 4 belongs to a scheme in which, instead of transferring images of a document surface by a lens array and reading them by image pickup devices, images on a document are directly read by image pickup devices mounted very close to the document. In the document scanning device, light reflected from the document surface is caused to propagate within a thin transparent substrate and is collected to the image pickup devices by a concave mirror. As is also clear from FIG. 2 in the Patent Citation 4, the concave mirror has a cylindrical shape and thus does not have an image-forming action in the main scanning direction (hereinafter referred to as conventional method 4).

Patent Citation 1: Japanese Unexamined Patent Publication No. 10-308852

Patent Citation 2: Japanese Unexamined Patent Publication No. 8-204899

Patent Citation 3: Japanese Unexamined Patent Publication No. 5-14600

Patent Citation 4: Japanese Unexamined Patent Publication No. 3-99576 (P2, the third paragraph of the upper-right column)

DISCLOSURE OF INVENTION

Technical Problem

As for the conventional method 1, although it has, as described above, the advantage in that the depth of field is large, there is a problem in that an optical system is increased in size. There is also another problem that in order to prevent an optical path from the document surface to the lens from changing upon moving mirrors, moving speeds of the plurality of mirrors present in the middle of the optical path need to be controlled and thereby requires costs.

As for the conventional method 2, although there is an advantage in that the size is small and the cost is low, there are problems that the depth of field is small and that chromatic aberration is large.

As for the conventional method 3, when the depth of field is increased, there are problems that the size of the device increases and that chromatic aberration increases.

As for the conventional method 4, there is a problem that the depth of field cannot be increased in principle.

The present invention has been made to solve such problems as described above and an object of the present invention is to provide an image-scanning device having a large depth of field and being small in size.

Technical Solution

To achieve the above-described object, the present invention is configured as follows.

That is, an image-scanning device according to a first aspect of the present invention includes: an illuminating device configured to illuminate an object being picked up which corresponds to an imaging target; a plurality of image-forming optical systems configured to form images of the object being picked up; an image pickup device configured to be located so as to correspond to the image-forming optical systems and to pickup the formed images; and an image processing device configured to restore an original object being picked up from the images obtained by the image pickup device, wherein the plurality of image-forming optical systems are arranged to be adjacent to each other in a main scanning direction with respect to the object being picked up, and form images of the object being picked up such that the object being picked up is inverted and reduced in size, and each of the image-forming optical systems includes a first optical element having a first focal length; an aperture member located at a focus position in a rear side of the first optical element; and a second optical element provided in a rear side of the aperture member and having a second focal length shorter than the first focal length, the first optical element, the aperture member, and the second optical element being disposed from a side of the object being picked up to a side of the image pickup device.

Moreover, each of the image-forming optical systems may further include a mirror disposed in an optical path traveling from the object being picked up to the image pickup device and configured to fold the optical path.

Moreover, each of the aperture members may have a mirror at an opening of the aperture member, the mirror folding an optical path.

Moreover, at least one of the first optical element and the second optical element may be a reflective-type mirror lens.

At least one of the first optical element and the second optical element may be molded into one piece between adjacent image-forming optical systems.

The aperture member can be changed with an aperture member having an opening different in size.

Each of the image-forming optical systems may further include a light-shielding plate disposed between adjacent second optical elements.

A size-reduction magnification may be identical for all the image-forming optical systems and is 0.85 to 0.6×.

Advantageous Effects

The image-scanning device according to the first aspect of the present invention includes a plurality of image-forming optical systems and the image pickup device. In each image-forming optical system, the first optical element, the aperture member, and the second optical element are disposed in this order from the object being picked up to the image pickup device. In this case, the first optical element and the aperture member are disposed at the first focal length of the first optical element. That is, on the object being picked up side, each of the image-forming optical systems is configured by a telecentric optical system. Thus, principal ray emitted from each point of the object being picked up, i.e., light ray passing through the center of an entrance pupil of each image-forming optical system, is vertical to a surface of the object being picked up. Hence, even when a position of the surface of the object being picked up is changed, a transfer magnification does not change, and thereby an effect that the depth of field can be increased is obtained.

Furthermore, each of the image-forming optical systems sets the second focal length of the second optical element to a value smaller than the first focal length of the first optical element and forms an image of the object being picked up such that the image is inverted and reduced in size. Thus, the image-scanning device can be reduced in size. In addition, images do not overlap each other between adjacent image-forming optical systems. To restore an original object being picked up, images having been obtained by the respective image-forming optical systems are combined by image processing. That is, an effect is obtained that since the image-forming optical systems are reduction optical systems, the images do not overlap each other although inverted images are obtained by the respective image-forming optical systems. Furthermore, even when positional displacement of images occurs between image-forming optical systems due to lens manufacturing error, assembly error, and the like between the image-forming optical systems, erected image with no displacement can be restored by correction within image processing. Thus, there is another effect that manufacturing error of the entire optical system can be lessened.

EXPLANATION OF REFERENCE

1 Document surface
3 First lens array
4 Second lens array
5 Aperture member array
8 Image pickup device
13 Cell
101 to 106 Image-scanning device
120 and 121 Folding mirror
123 First mirror lens array
124 Second mirror lens array
125 Reflective-type aperture member array
125a Opening
129 Light-shielding wall
200 Illuminating device
201 Image processing device

BEST MODE FOR CARRYING OUT THE INVENTION

Image-scanning devices which are embodiments of the present invention will be described below with reference to the drawings. Note that in the drawings the same or like components are denoted by the same reference numerals.

First Embodiment

Figure 1:
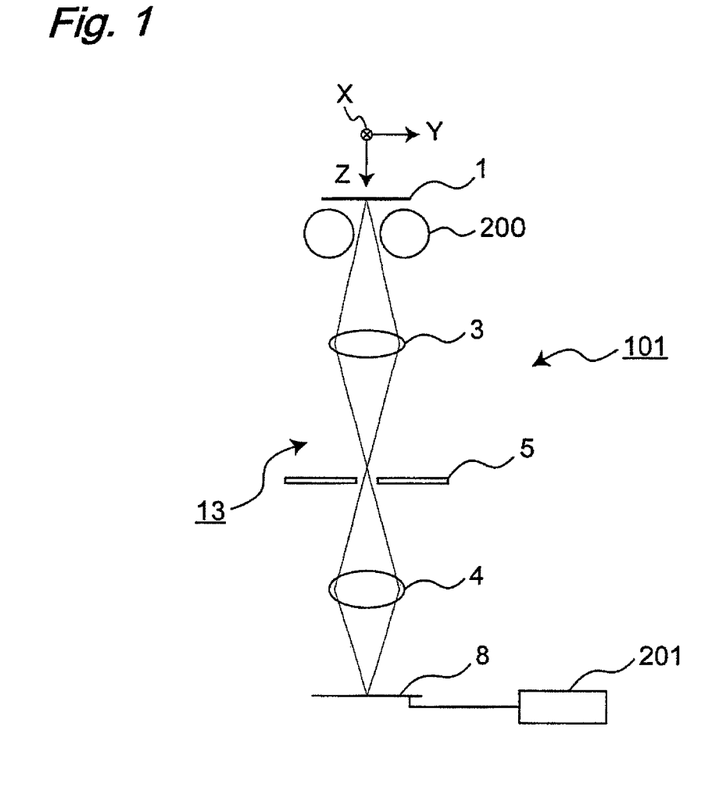
FIG. 1 is a diagram showing a schematic configuration of an image-scanning device in a first embodiment of the present invention.
Figure 2:
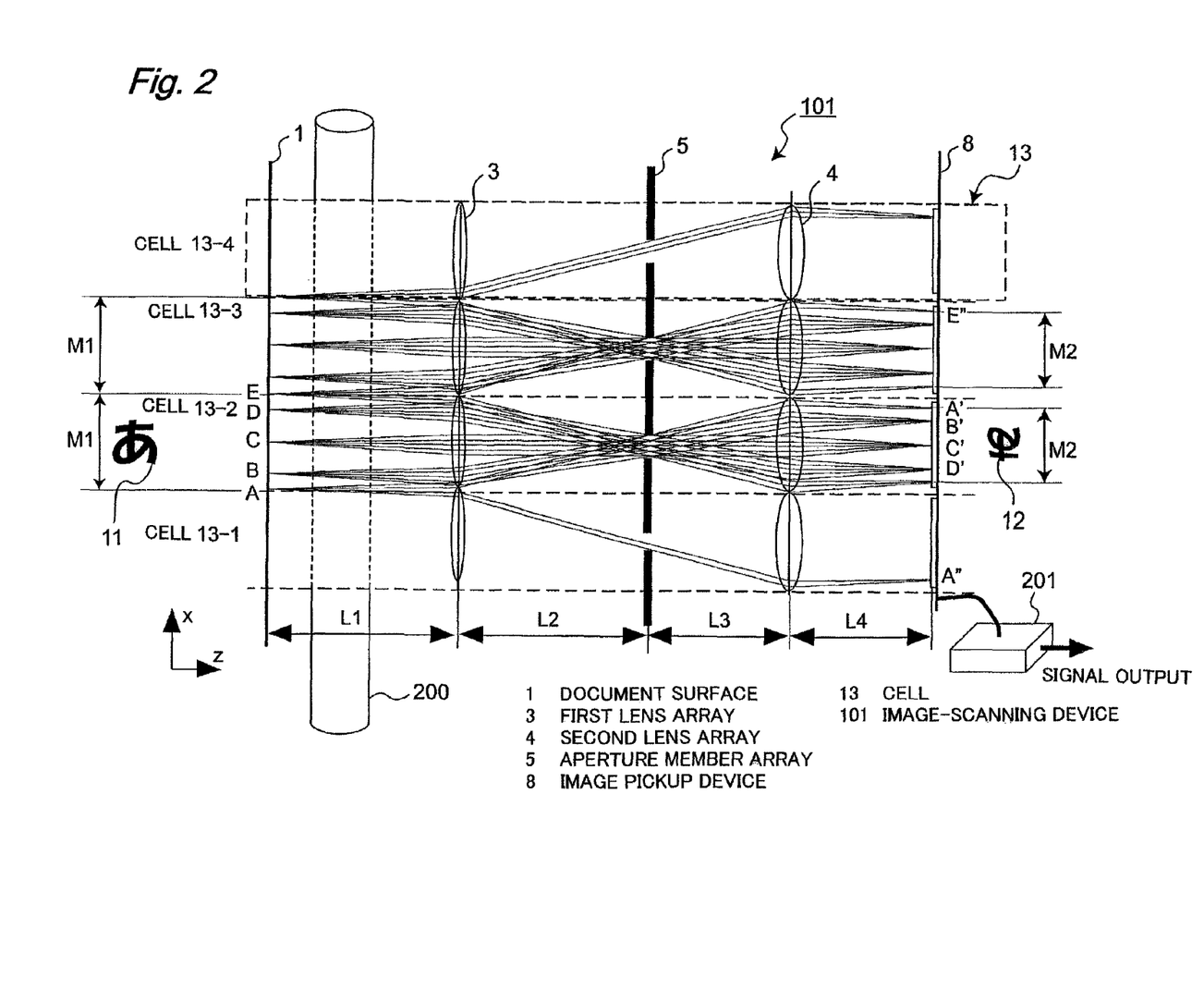
FIG. 2 is a configuration diagram of optical systems of the image-scanning device shown in FIG. 1.

FIG. 1 shows an example of a schematic configuration of one of cells 13 which will be described below and which is included in an image-scanning device 101 according to a first embodiment of the present invention. FIG. 2 is a plan view showing a principle of a configuration of the image-scanning device 101. The image-scanning device 101 mainly includes cells 13 corresponding to an example serving as an image-forming optical systems and image pickup devices 8 provided for the respective cells 13, the same of which applies to embodiments described below, and includes an illuminating device 200 for illuminating an object being picked up which is an imaging target. Each of the cells 13 is an optical system that forms image of the object being picked up such that the image is inverted and reduced in size, and the cells 13 are disposed linearly so as to be adjacent to each other in a main scanning direction with respect to the object being picked up, i.e., an X-direction shown in FIG. 2. Each cell 13 has a first lens 3 corresponding to an example serving as a first optical element, an aperture member 5, and a second lens 4 corresponding to an example serving as a second optical element. These components are disposed in the order of the first lens 3, the aperture member 5, and the second lens 4 from the object being picked up side toward the image pickup device 8. Image signals obtained by the image pickup devices 8 are sent to an image processing device 201 which is normally used in image-scanning devices. The image signals processed by the image processing device 201 are outputted and the signals are used in a device using the images. Examples of the device that uses the images include a display, a document writing device, and a bill authentication determining device. Note that in the following, letters, for example, on a document surface 1 are taken as an example of the object being picked up. The image-scanning device 101 will be more specifically described with reference to the drawings.

Each cell 13 has a size of width M1 in the X-direction, and the cells 13 are arranged in the X-direction at a spacing (pitch) of distance M1 which is the same dimension as the width. Note that FIG. 2 shows a configuration in which four cells, i.e., cells 13-1 to 13-4, are arranged in the X-direction, however, the configuration is not limited thereto and the image-scanning device 101 may have a plurality of, i.e., two or more cells 13.

FIG. 2 showing this principle configuration is made assuming that the lenses are thin lens with which paraxial approximation is established. That is, principal planes of the front and rear of each of the first lens 3 and the second lens 4 match each other at a central location of the lens in a thickness direction. A focal length (corresponding to a first focal length) of the first lens 3 is f1 and a focal length (corresponding to a second focal length) of the second lens 4 is f2.

A distance from the document surface 1 to the first lens 3, more specifically, a distance L1 from the document surface 1 to the front principal plane of the first lens 3, along an optical path from the document surface 1 to the one-dimensional image pickup device 8 is approximately the first focal length f1. A distance from the first lens 3 to the aperture member 5, more specifically, a distance L2 from the rear principal plane of the first lens 3 to the aperture member 5, is the first focal length f1. Furthermore, a distance from the aperture member 5 to the second lens 4, more specifically, a distance L3 from the aperture member 5 to the front principal plane of the second lens 4, is approximately the second focal length f2. A distance from the second lens 4 to the one-dimensional image pickup device 8, more specifically, a distance L4 from the rear principal plane of the second lens 4 to the one-dimensional image pickup device 8, is approximately the second focal length f2. Thus, the one-dimensional image pickup device 8 is located so as to correspond to locations where images of letters on the document surface 1 are formed.

Note that since the cells 13 are arranged in the main scanning direction as described above, the first lenses 3, the aperture member 5, and the second lenses 4 included in the respective cells 13 are disposed in the form of an array along the main scanning direction. Hence, in the following, they may be represented as a first lens array 3, an aperture member array 5, and a second lens array 4.

Figures 5, 6:
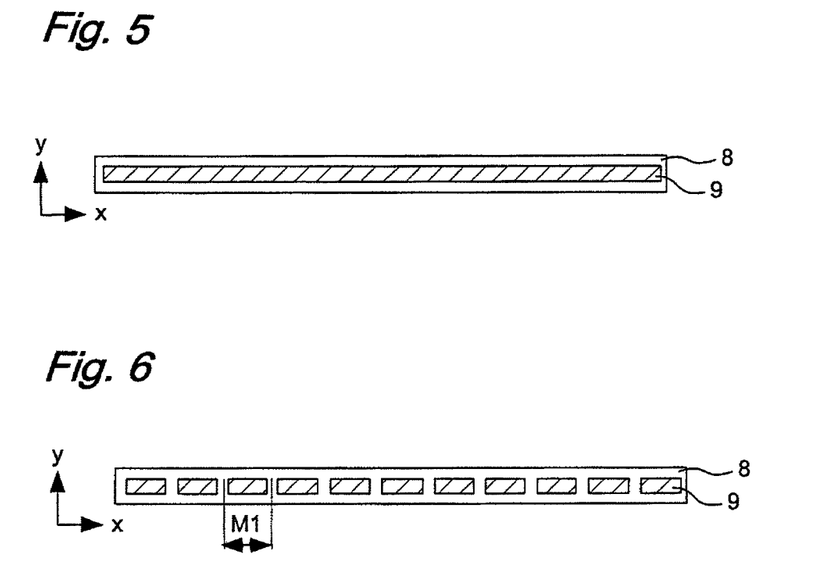
FIG. 5 is a diagram showing an example of the configuration of the image pickup device of the image-scanning device shown in FIG. 2.
FIG. 6 is a diagram showing another example of the configuration of the image pickup device of the image-scanning device shown in FIG. 2.

The one-dimensional image pickup device 8 may be obtained by forming on a substrate a light-receiving region 9 which is continuously formed in the main scanning direction (X-direction), as shown in FIG. 5, or may be obtained by forming light-receiving regions 9 only in regions which are divided cell-by-cell 13 and in which images are formed, as shown in FIG. 6. The configuration shown in FIG. 5 has an advantage in that assembly of the image pickup device 8 is easy and the configuration shown in FIG. 6 has an advantage in that an amount of silicon used to form the image pickup device 8 is small and thus a reduction in cost is achieved.

Here, to facilitate the following description, specific numerical values are assigned. The focal lengths of the first lens 3 and the second lens 4 are respectively f1=12 mm and f2=9 mm. Thus, the distance L2=12 mm. The distance L1 does not necessarily need to be equal to f1, but in this embodiment, the distance L1=12 mm. Similarly, the distance L3 does not necessarily need to be equal to f2, but in this embodiment, the distance L3=9 mm. At this time, the distance L4=9 mm. The width M1 of the cell 13 in the main scanning direction is M1=6 mm. The shape of openings of the aperture member 5 is circular and the diameter thereof is $\phi$1.2 mm.

In the optical systems in FIG. 2, trajectories of light rays from a certain sequence of point on the document surface 1 are also shown in the drawing. Using the trajectories of light rays, the characteristics of the optical systems of the image-scanning device 101 configured in the above-described manner will be described together with their operations.

A first characteristic is that each cell 13 serves as an inverting and size-reducing optical system. Thus, the image-scanning device 101 that is small in size relative to the size of the object being picked up which is the imaging target can be configured.

Specifically, light rays emitted from the sequence of points A, B, C, D, and E on the document surface 1 form images at points A', B', C', D', and E' on a surface of the image pickup device 8. Note, however, that light rays from point A and point E on the document surface 1 which are present at boundaries between cells 13 also form images at point A" and point E". Since the relationship of the focal length between the first lens 3 and the second lens 4 is f1>f2, the transfer relationship of each cell 13 is inversion and size-reduction. In the case of an example by the aforementioned specific numerical values, the size-reduction magnification is: f2÷f1=0.75×.

Hence, image information on the document surface 1 forms an image in which the image information is inverted and reduced in size by a factor of 0.75× in the main scanning direction (X-direction) on an image-forming surface. This is schematically shown with a Japanese hiragana character "あ" denoted by reference numeral 11 and a Japanese hiragana character "あ" denoted by reference numeral 12. When the hiragana character "あ" is present within one cell 13 on the document surface 1, a portion of the image pickup device 8 corresponding to the above cell 13 obtains the hiragana character "あ" 12 that is the inverted and size-reduced version of the hiragana character "あ" 11. As this manner, since each cell 13 configures a size-reducing optical system, even if an image is inverted in each cell 13, images do not overlap each other between cells 13 and thus original object being picked up can be reproduced by using image correction. The image correction is processed by the image processing device 201.

Figure 3:
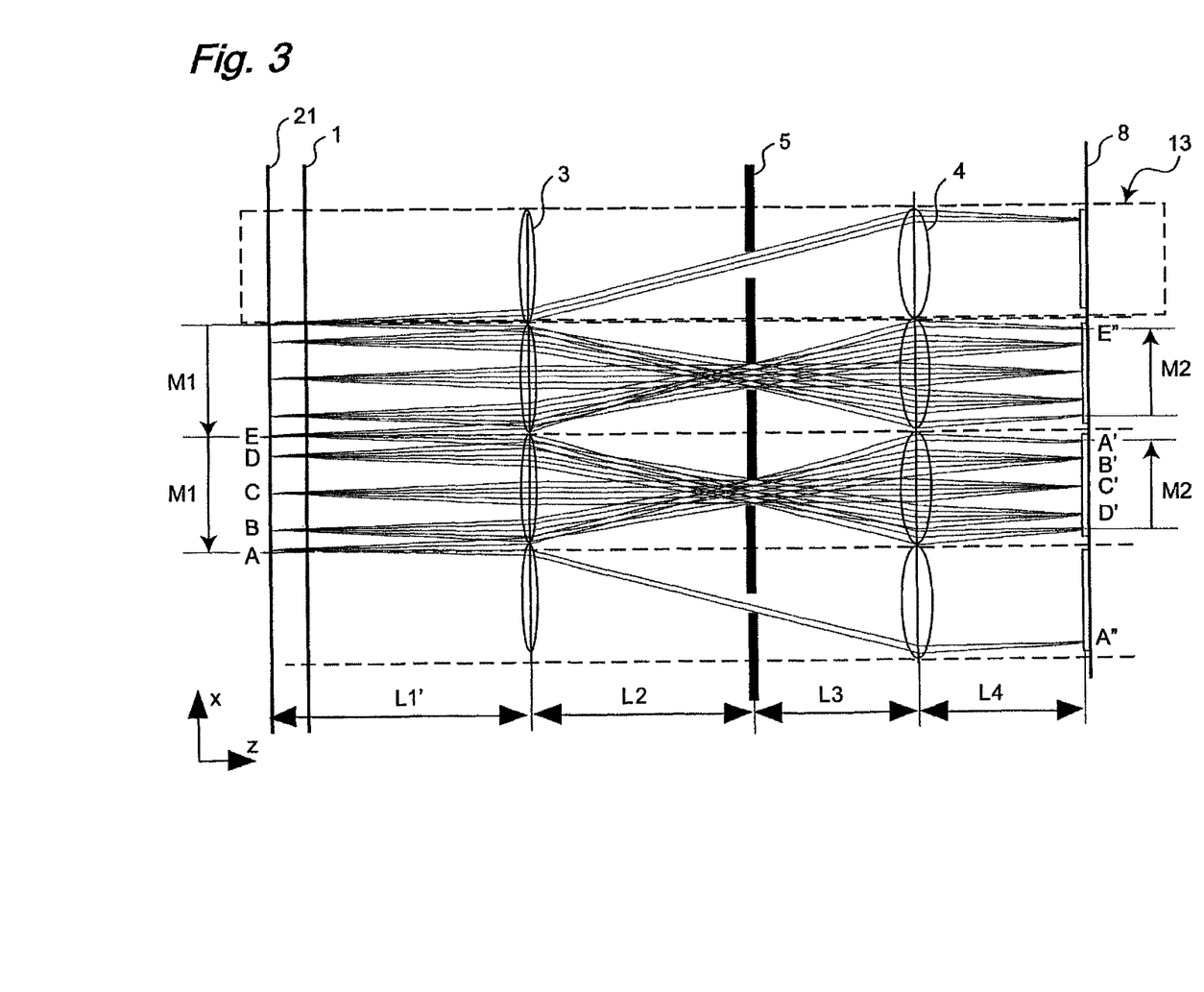
FIG. 3 is a diagram showing a state in a case where a document surface is moved in the image-scanning device shown in FIG. 2.

A second characteristic is that the cells 13 configure telecentric optical systems on the surface side of the object being picked up. This is a conclusion derived from the fact that the distance L2 is equal to the first focal length f1, and in each cell 13, a light ray (principal ray) passing through the center of the opening of the aperture member 5 is a light ray emitted vertically from the document surface 1. That is, the principal ray is parallel to an optical axis. In such a configuration, as shown in FIG. 3, even if the document surface 1 is displaced to a document surface 21 in the optical axis direction (Z-direction), the transfer magnification does not change and remains as 0.75×. A focused position on the image-forming surface does not change in the main scanning direction but only changes in the optical axis direction (Z-direction). By thus configuring the telecentric optical system, each optical system having the large depth of field in the Z-direction can be designed.

The size of the depth of field is determined substantially by a numerical aperture F of each optical system. For example, in the above-described specific case, the numerical aperture F of the optical system of each cell 13 is F=10. A resolution (pixel density) of general copiers is 600 dpi, i.e., one pixel is 42 µm. For an MTF value that is required for an optical system, there is a guideline that, for example, 30% or more should be ensured at a spatial frequency value of 61 p/mm. In the above-described case of F=10, the specific numerical value of the depth of field that meets the guideline for the MTF is, for example, ±1 mm if a specific value is given, although it naturally varies depending on each individual specific lens design. The depth of field can be arbitrarily set only by changing the diameter of the opening of the aperture member 5. By reducing the diameter of the opening to increase the F value, a larger depth of field can be obtained.

Thus, in order to allow the change of the depth of field easily, the image-scanning device 101 may adopt a structure in which the aperture member 5 can be changed with another or may include an aperture member having a structure in which the size of openings is variable. Note that this configuration can also be adopted in the embodiments described below.

A third characteristic is that the cells 13 having width M1 are arranged linearly so as to be adjacent to each other at a predetermined distance M1. A light ray that is emitted from the vicinity of the center of each cell 13, e.g., point C, passes through only those optical elements disposed in one cell 13 and forms an image on the image pickup device 8. Meanwhile, light rays from the document surface 1 at a boundary portion between cells 13, e.g., point A at a boundary between the cell 13-1 and the cell 13-2, separately form images at point A' belonging to the cell 13-2 and point A" belonging to the cell 13-1 on the surfaces of the image pickup devices 8. Specifically, a light ray belonging to the cell 13-1 on the first lens array 3 passes through an optical path in the cell 13-1 and reaches point A", and a light ray belonging to the cell 13-2 on the second lens array 4 passes through an optical path in the cell 13-2 and reaches point A'. Also in the case of points near point A, according to proportion of light rays reaching the first lens array 3, the light rays are distributed to the cell 13-1 and the cell 13-2 and formed into images near point A' and near point A".

That is, the image in the vicinity of the boundary between adjacent cells 13 appears as images in the adjacent two cells 13 on the surfaces of the image pickup devices 8, and each light intensity thereof decreases according to the distribution proportion of light rays at the first lens array 3.

Figure 4:
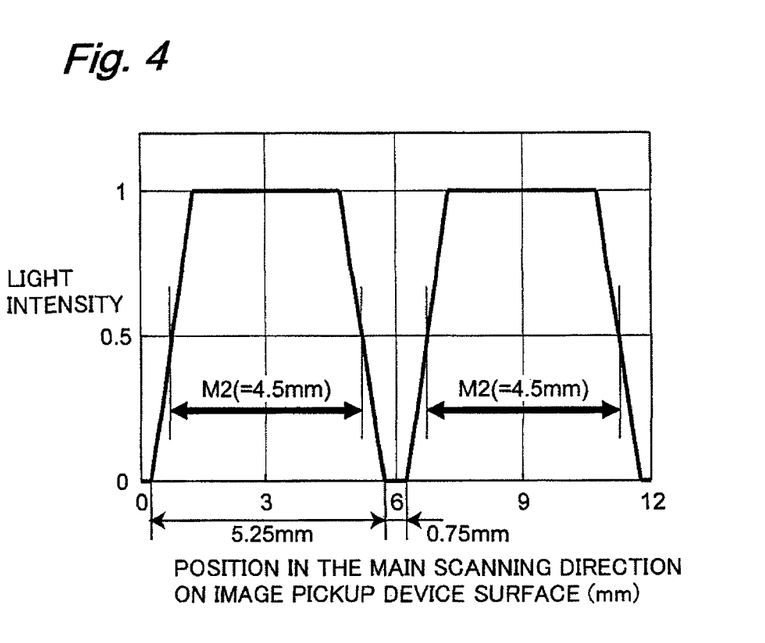
FIG. 4 is a graph showing a light intensity distribution in a main scanning direction on a surface of an image pickup device of the image-scanning device shown in FIG. 2.

It is assumed that a white paper is placed on the document surface 1 and the document surface 1 is illuminated with illuminating light having a uniform intensity distribution by the illuminating device 200. In other words, it is assumed that there is light emission with the uniform intensity from all points on the document surface 1. The intensity distribution on the surfaces of the image pickup devices 8 in this case is as shown in FIG. 4, when a boundary between certain cells 13 is taken as a point of origin. Specifically, the width M1=6 mm of each cell 13 on the document surface 1 is reduced to width M2=6×0.75=4.5 mm on the surface of the image pickup device 8. The light intensity of the location corresponding to the cell boundary on the document surface 1 is 0.5 relative to the center of the cell 13. An image does not suddenly disappear outside width M2 and the intensity gently decreases as it gets closer to the boundary portion. On the other hand, even inside width M2, the light intensity is not completely 1 in the vicinity of the boundary portion. As shown in FIG. 4, an image is present at a width of about 5.25 mm, exceeding width M2=4.5 mm. Each of portions of an image in regions on both sides of the image, each having a width of 0.375 mm, exceeding the width of 4.5 mm shares the same image as that present in a portion of an image of its adjacent cell. Since the basic dimension of the cell is 6 mm, a region where an image is not present between adjacent cells is 0.75 mm, which is a margin.

An important point that can be seen from FIG. 4 is that the light intensity reaches zero at the boundary portion between the cells 13. That is, it means that images in the adjacent cells 13 do not overlap each other. Hence, when an inverted image is obtained by each cell 13 and even when the boundary portions of respective cells 13 are caused to overlap each other, ghost-free images can be obtained. Furthermore, even if, by overlapping images on each other that are present at the boundary portion where the light intensity is weak, a single cell 13 obtains an image with weak light intensity at the boundary portion, original light intensity can be restored.

The smaller the size-reduction magnification is than 0.75×, the more certain the overlapping of images at boundary portions can be prevented. Meanwhile, the one pixel size of the sensor also needs to be reduced according to the size-reduction magnification. Thus, a problem arises that the light-receiving sensitivity of the image pickup device decreases. That is, to maintain a resolution of 600 dpi on the document surface, one pixel being 42 µm is appropriate on the document surface but one pixel is 31.5 µm on the image pickup device. A solid-state image pickup device generally has an insensitive region such as a signal transfer path, in addition to a light-receiving surface. The width of the insensitive region is invariant even when the pixel size of the image pickup device is reduced and thus the proportion of the light-receiving surface becomes relatively small. In other words, the aperture ratio of the image pickup device decreases. Hence, reducing the size-reduction magnification too much causes an inconvenience of causing a decrease in light-receiving sensitivity. When the light-receiving sensitivity decreases, illumination intensity needs to be increased, causing problems in terms of power consumption and cost.

In other words, it can be said that the size-reduction magnification is most desirably the order of 0.75×, taking the margins into account. Of course, as described above, depending on how much margin is taken, the size-reduction magnification may be changed in the neighborhood of 0.75× and may be set in a range of, for example, from 0.85× to 0.6×. To change the size-reduction magnification, the ratio between the first focal length f1 and the second focal length f2 is changed.

As described above, according to the image-scanning device 101 of the present first embodiment, effects that cannot be observed in conventional cases can be provided, i.e., since the image-scanning device 101 is configured by the plurality of cells 13, the image-scanning device 101 has the characteristic of normal contact-type image pickup devices, i.e., small size, and even when the position of the document surface 1 is changed in the optical-axis direction (Z-direction) the transfer magnification does not change and thus the depth of field can be increased.

Second Embodiment

Figure 7:
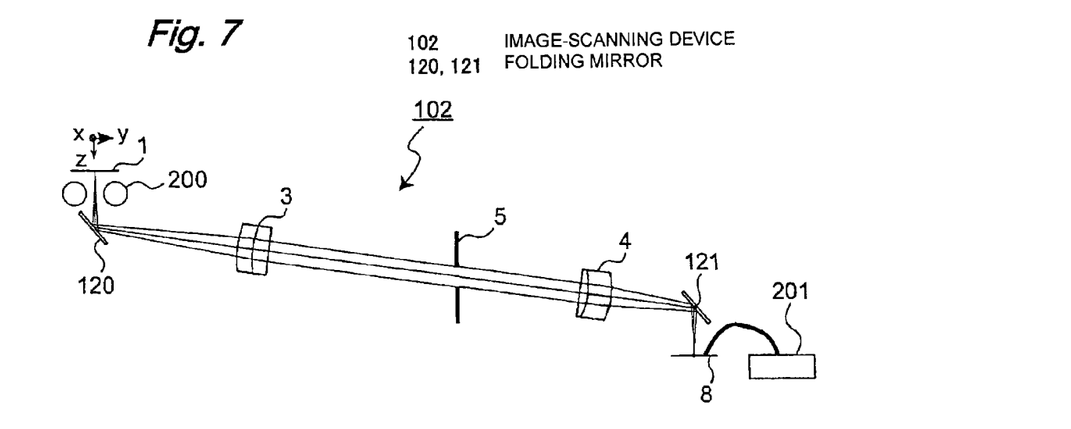
FIG. 7 is a configuration diagram of optical systems of an image-scanning device in a second embodiment of the present invention.
Figure 8:
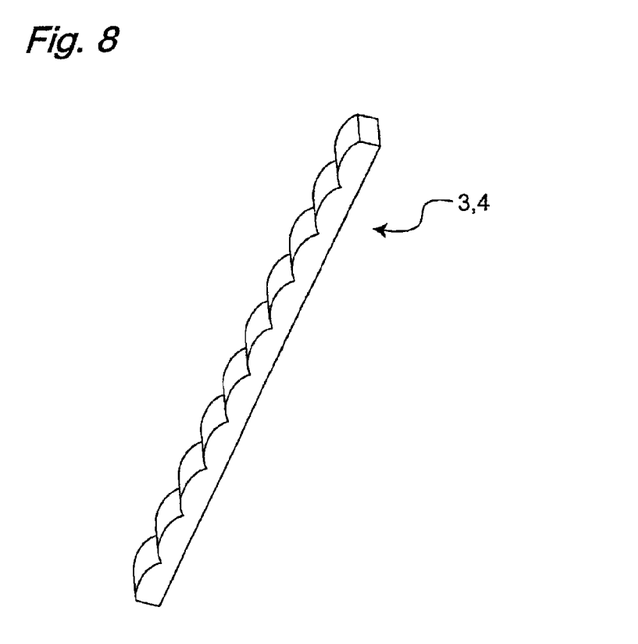
FIG. 8 is a perspective view of a first and a second lens array of a transmissive-type included in the image-scanning device shown in FIG. 7.

FIG. 7 is a plan view showing a configuration of an image-scanning device 102 according to a second embodiment of the present invention. A direction perpendicular to the paper is the main scanning direction and cells 13 described in the first embodiment are arranged in this direction. Specifically, in FIG. 7, although the first lens array 3 and the second lens array 4 cannot be shown in an array form, the configuration is such that a plurality of lenses are arranged in the direction perpendicular to the paper. FIG. 8 shows a perspective view of the first lens array 3 and the second lens array 4. The aperture member 5 have a configuration such as that shown in FIG. 9, for example, as viewed from a y-direction shown in FIG. 7.

In the image-scanning device 102 according to the second embodiment, the document surface 1 is irradiated by the illuminating devices 200 and folding mirrors 120 and 121 that fold an optical path are inserted in the middle of the optical path that reads diffused and reflected light on the document surface 1. Specifically, the folding mirror 120 is provided between the document surface 1 and the first lens array 3 and the folding mirror 121 is provided between the second lens array 4 and the image pickup devices 8. Note that also in the image-scanning device 102 having such a configuration, the above-described distances L1 to L4 are maintained. Image signals obtained by the image pickup devices 8 are sent to the image processing device 201 and the same image correction as that described in the first embodiment is performed.

To increase the depth of field in the side of the document surface 1, a configuration is adopted in which lenses with a large focal length are used and an aperture member are inserted to focus bundles of rays. This configuration, however, increases an optical path length. On the other hand, according to the image-scanning device 102 according to the second embodiment, the optical path is folded by providing the folding mirrors 120 and 121 and thus optical systems can be made small in size, as described above. In the image-scanning device 102, the device thickness in the z-direction shown in FIG. 7, i.e., a direction vertical to the document surface 1, can be reduced. Thus, an effect can be provided that an image-scanning device can be configured to be more compact than the image-scanning device in the first embodiment.

Note that the image-scanning device 102 according to the second embodiment also has the basic configuration of optical systems same as that in the first embodiment, the effects provided by the image-scanning device 101 of the first embodiment can be obtained.

Third Embodiment

Figure 10:
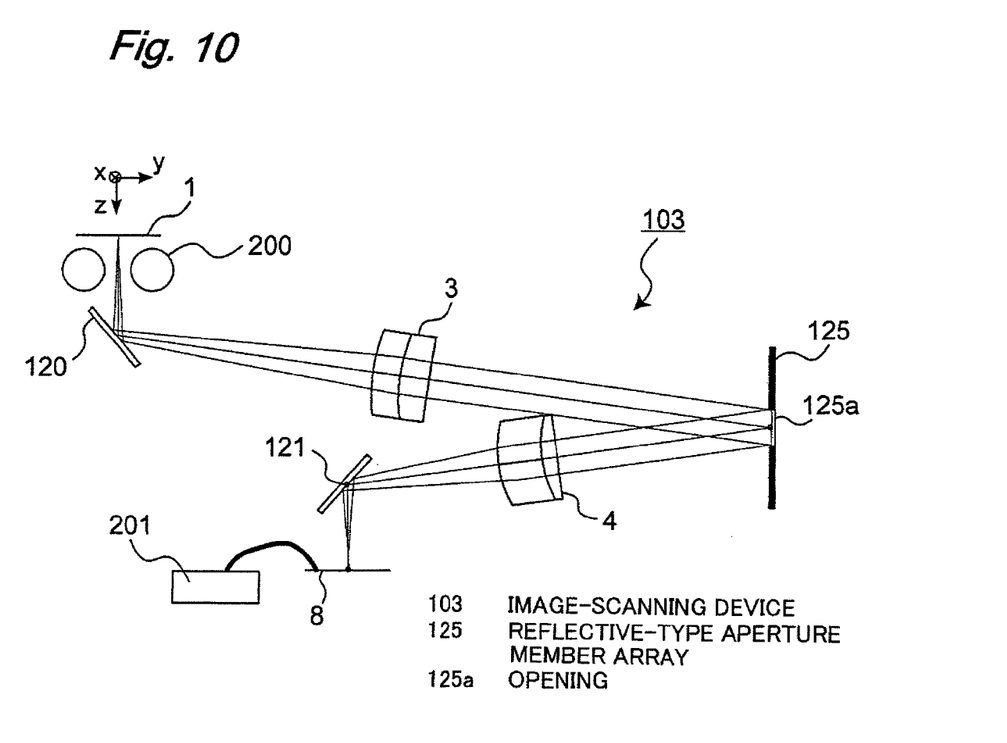
FIG. 10 is a configuration diagram of optical systems of an image-scanning device in a third embodiment of the present invention.

FIG. 10 is a plan view showing a configuration of an image-scanning device 103 according to a third embodiment of the present invention. In the image-scanning device 103, in addition to the configuration in the second embodiment, folding mirrors 125a that fold an optical path are provided at respective openings of an aperture member 125. Note that instead of the aperture member 5, the aperture member 125 having mirrors 125a can also be provided to the configuration in the first embodiment.

Figure 9:
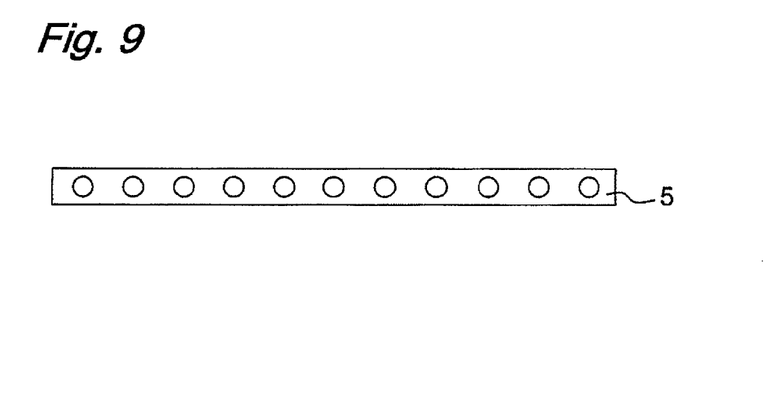
FIG. 9 is a plan view of an aperture member array included in the image-scanning device shown in FIG. 7.

Such reflective-type aperture member array 125 can be fabricated by various methods including, for example, a method in which a pattern such as that shown in FIG. 9 is printed on a planar mirror, and a method in which holes for openings are made in a plate to form an aperture member array such as that shown in FIG. 9 and then the plate is stacked on a planar mirror.

By setting mounting angles of folding mirrors 120 and 121 to a value exceeding 45° with respect to a document surface 1, incident light and reflected light from the reflective-type aperture member array 125 can be spatially separated. Moreover, in the image-scanning device 103 having such a configuration, the above-described distances L1 to L4 are maintained.

According to the image-scanning device 103 according to the third embodiment, the effects provided by the image-scanning device 101 of the first embodiment can be, of course, obtained and also an image-scanning device that is reduced in size in the y-direction in FIG. 10 and that is more compact than the configuration in the second embodiment can be provided.

Note that in the above-described first to third embodiments when the first lens array 3 and the second lens array 4 are refractive-type single lenses, a problem of occurrence of chromatic aberration arises. Hence, when a color image is read, an image to be obtained is separated color by color and thus an excellent image cannot be obtained. To prevent such a phenomenon, the first lens array 3 and the second lens array 4 each should be configured by achromatic lenses. For a general technique for configuring achromatic lenses, a method can be adopted in which two lens materials having different refractive indices and Abbe numbers are combined.

Fourth Embodiment

Figure 11:
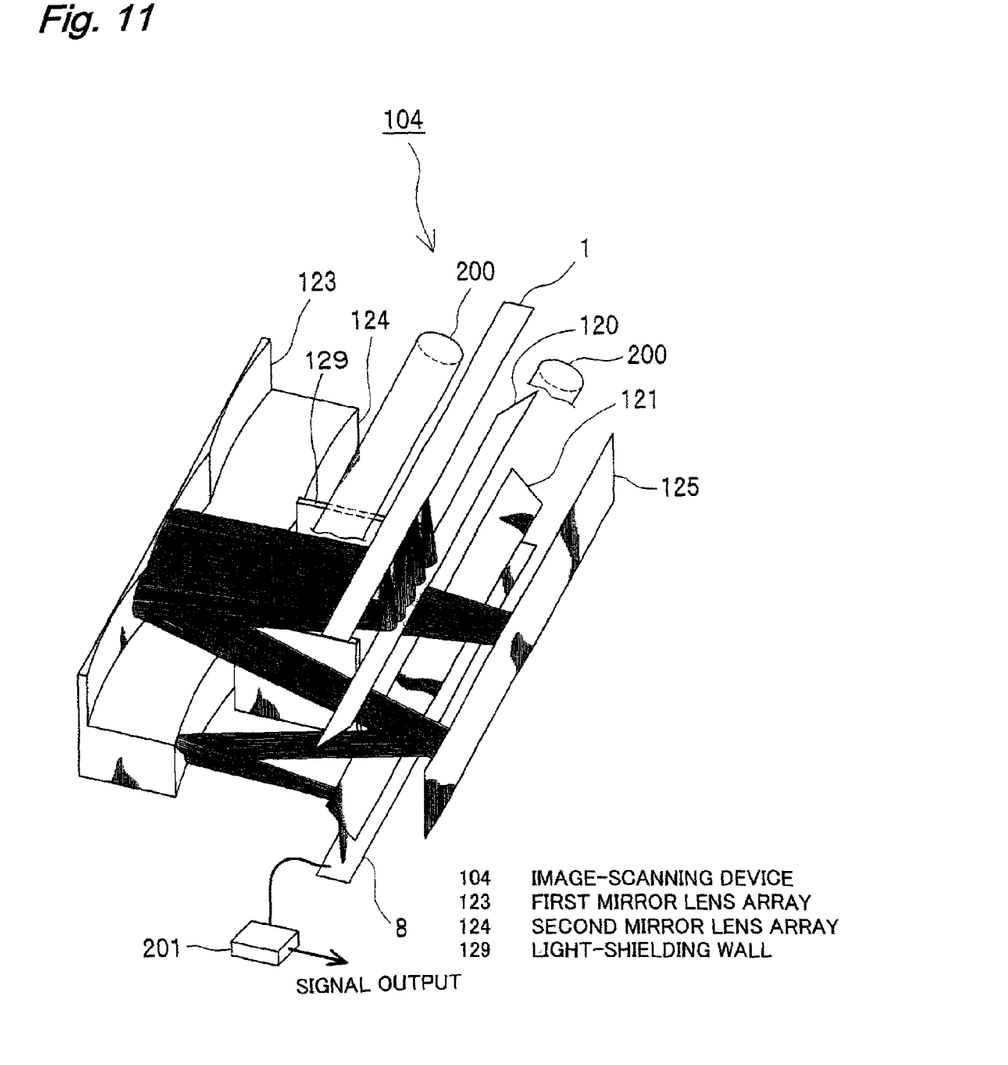
FIG. 11 is a perspective view showing a configuration of optical systems of an image-scanning device in a fourth embodiment of the present invention.

FIG. 11 is a perspective view showing a configuration of an image-scanning device 104 according to a fourth embodiment of the present invention. The image-scanning device 104 in the present fourth embodiment has a configuration that is based on the configuration described in the first embodiment and that includes the above-described folding mirrors 120 and 121 and reflective-type aperture member array 125 and further includes a reflective-type first mirror lens array 123 and a reflective-type second mirror lens array 124 which are respectively formed of the first lens array 3 and the second lens array 4 in the reflective-type. In this case, the first mirror lens array 123 corresponds to an example serving as the first optical element and the second mirror lens array 124 corresponds to an example serving as the second optical element.

Note that although herein both of the first lens array 3 and the second lens array 4 are formed of the reflective-type first mirror lens array 123 and the reflective-type second mirror lens array 124, one of the first lens array 3 and the second lens array 4 may be changed to the reflective-type first mirror lens array 123 or the reflective-type second mirror lens array 124. In the configurations in the first and second embodiments, at least one of the first lens array 3 and the second lens array 4 may be changed to the first mirror lens array 123 and the second mirror lens array 124.

Note that, although not shown in FIG. 11, a cover glass is normally present under the document surface 1. The cover glass is an essential element to place the document thereon and also serves to protect the entire optical system. Each optical element will be described in detail below. Members denoted by reference numeral 129 in FIG. 11 are light-shielding walls which will be described in the following sixth embodiment and a description thereof is not given.

In practice, document surface 1 is irradiated by illuminating devices 200 and diffused and reflected light from the document surface 1 is read. A light flux emitted from a certain point on the document surface 1 will be considered. Light rays having transmitted through the cover glass reach the first mirror lens array 123 such that their optical path is folded by the folding mirror 120. In the present embodiment, the mounting angle of the folding mirror 120 is set to an angle of 48° relative to the document surface 1. By this mounting angle, the angle of incidence of the light rays on the first mirror lens array 123 is 6° relative to the direction of the normal to the first mirror lens array 123. By this slightly oblique incidence, reflected light from the first mirror lens array 123 can be separated from incident light and reaches the subsequent mirror-type aperture member array 125.

The optical length from the document surface 1 to the first mirror lens array 123 is 12 mm. Lenses for respective cells 13 in the first mirror lens array 123 are concave mirror lenses with focal length f1=12 mm and, as can also be seen from FIG. 8, the opening shape of the lenses is rectangular. A width, i.e., the width in the sub-scanning direction, of the opening shape of the lenses for the respective cells 13 is 6 mm. A role of such concave mirror lenses is to collimate incident light into substantially parallel rays. The curved shape of the concave mirror lenses may be spherical or may be aspherical to obtain better resolution.

The light rays collimated by the first mirror lens array 123 formed of the concave mirror lenses reach the reflective-type aperture member array 125 located at optical path distance L2=12 mm from the first mirror lens array 123. Each of openings 125a of the reflective-type aperture member array 125 is disposed at a location corresponding to the center of the corresponding cell 13. In the reflective-type aperture member array 125, the opening diameter of the openings 125a for the respective cells 13 is, for example, φ1.2 mm.

As described above, in the configuration of the present fourth embodiment, since first focal length f1=distance L2, the image-scanning device 104 also satisfies the condition of telecentric optical systems. Hence, the principal ray of the light flux passing through the openings 125a of the reflective-type aperture member array 125 is a light ray emitted vertically from the document surface 1. Thus, in the present fourth embodiment, as described in the first embodiment, even when the position of the document surface 1 is changed in a focus direction, the transfer magnification of the entire optical system does not change.

The light rays having passed through an opening 125a of the reflective-type aperture member array 125 reach the second mirror lens array 124. In the second mirror lens array 124, lenses for the respective cells 13 have a rectangular shape and have second focal length f2=9 mm. Although the optical path distance L3 from the reflective-type aperture member array 125 to the second mirror lens array 124 and the optical path distance L4 from the second mirror lens array 124 to the image pickup device 8 do not necessarily need to be equal to the second focal length f2=9 mm, in this example, the distance L3=the distance L4=9 mm. When the distance L3=f2, an image plane side also satisfies the condition of the telecentric optical system and thus the transfer magnification can be prevented from changing by the positional displacement of the image pickup devices 8 in the focus direction.

On the side of the image pickup devices 8, unlike the side of the document surface 1, the optical path distance from the second mirror lens array 124 to the image pickup devices 8 is basically fixed and thus the condition of the telecentric optical system does not necessarily need to be satisfied. However, when the image plane side is also made to be the telecentric optical system, there can be obtained an optical system that has little variations and changes in the transfer magnification when an assembly adjustment error or a change in distance due to temperature change occurs. The curved shape of the second mirror lens array 124 is also aspherical, if necessary, whereby the resolution of the entire transfer optical system can be increased.

The light flux reflected off the second mirror lens array 124 is folded in a vertical direction by the folding mirror 121 and forms images on the surface of the image pickup devices 8. The image signals obtained by the image pickup devices 8 are sent to the image processing device 201 and the same image correction as that described in the first embodiment is performed.

The configuration of the image-scanning device 104 of the present fourth embodiment is as described above. The characteristics of an image of an optical image to be obtained and an image processing method are the same as those described in the first embodiment and thus description thereof is not given herein.

According to the above-described image-scanning device 104, the effects provided by the image-scanning device 101 of the first embodiment can be, of course, obtained and the following two unique effects can be further obtained.

One effect is that since the first lens array and the second lens array are configured by reflective-type mirror lens arrays, optical paths are folded, enabling to configure more compact optical systems.

The other effect is that there is no chromatic dispersion in reflection and thus by using the reflective-type mirror lens arrays 123 and 124 chromatic dispersion does not occur. For a long array lens, it is realistically difficult in terms of cost to bond two different types of glasses together to fabricate a lens. Thus, in a color-image-scanning device that requires chromatic aberration correction, by using the reflective-type mirror lens array such as that in the present fourth embodiment, chromatic aberration correction is facilitated.

Fifth Embodiment

A configuration of the present fifth embodiment is such that in the above-described first to fourth embodiments, in at least one of the first lens array 3 and the second lens array 4, and in at least one of the first mirror lens array 123 and the second mirror lens array 124, lens portions for adjacent cells 13 are molded into one piece by a resin material.

In a configuration using reflective-type mirror lens arrays described in the above-described fourth embodiment, i.e., the configuration of the image-scanning device 104 shown in FIG. 11, the first mirror lens array 123 and the second mirror lens array 124 are configured to be close to each other and thus the two can be resin-molded into one piece. Hence, the configuration in the fifth embodiment has a great effect particularly on the configuration such as that in the fourth embodiment, and an improvement in positioning accuracy and a reduction in the number of components can greatly contribute to simplification of assembly of a device and a reduction in cost.

For example, when a document of A3 paper size is read, a length of about 300 mm is required in the main scanning direction. Assuming that the width of one cell 13 is 6 mm, 50 cells 13 need to be arranged. A first lens array 3, a second lens array 4, a first mirror lens array 123, and a second mirror lens array 124 which are arranged side-by-side for the 50 cells 13 can also be resin-molded into one piece. However, if such a large-sized lens array cannot be fabricated in terms of manufacturing, lens portions for a plurality of cells 13 may be molded into one piece as one unit and the units may be disposed side-by-side upon assembly. For example, when a lens array in which lenses for five cells are molded into one piece as one unit is fabricated, the width of the lens array in the main scanning direction is 30 mm and thus the processing of a molding die and resin molding are facilitated.

Sixth Embodiment

In the present sixth embodiment, a configuration is such that in the above-described second lens array 4 and second mirror lens array 124 in the first to fourth embodiments, a light-shielding wall 129 is provided between adjacent lenses.

Figure 12:
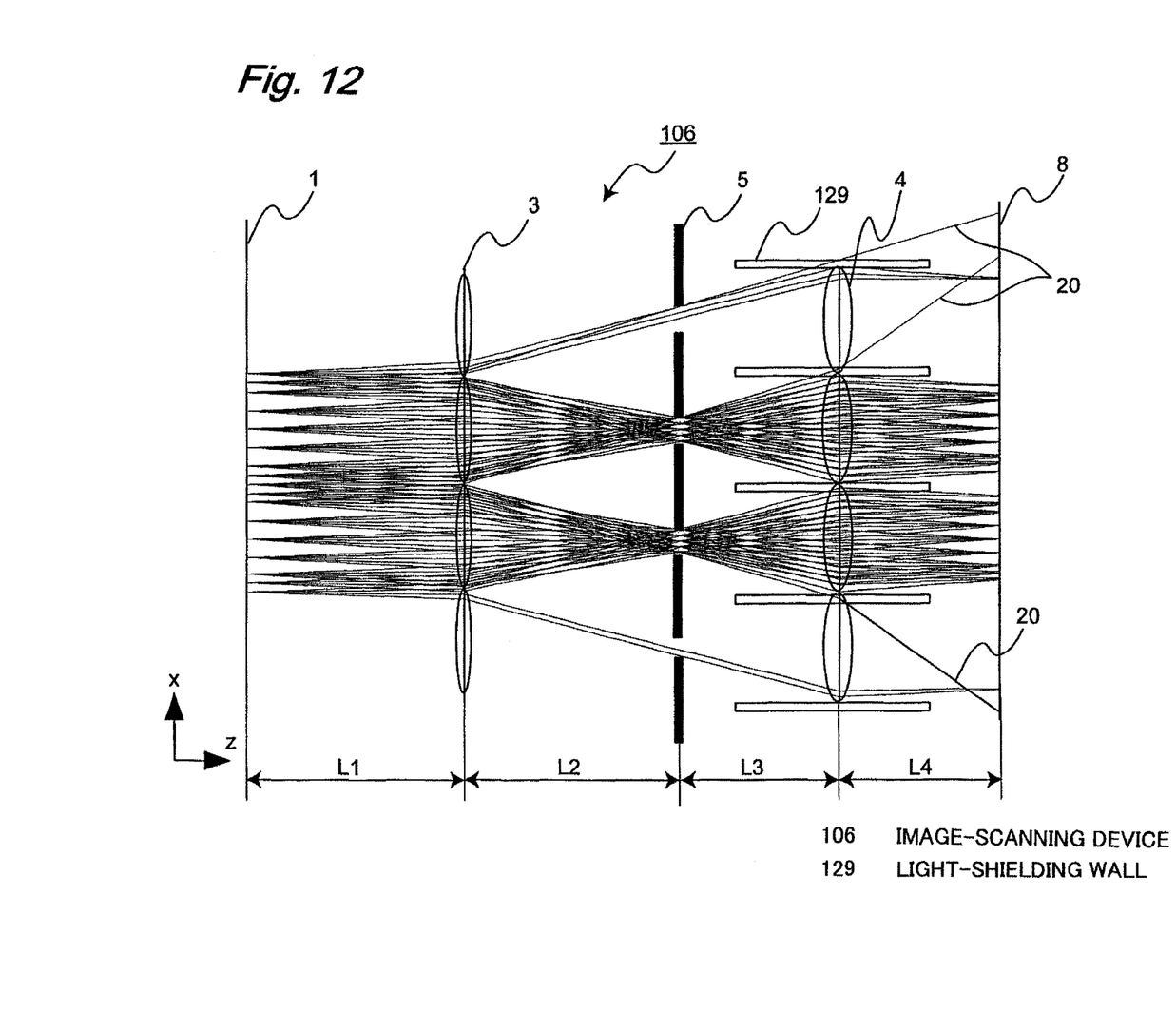
FIG. 12 is a configuration diagram of optical systems of an image-scanning device in a sixth embodiment of the present invention.

FIG. 12 is a plan view showing a configuration of an image-scanning device 106 having the above configuration of the sixth embodiment. The image-scanning device 106 shown in FIG. 12 has a configuration in which, for example, the light-shielding wall 129 is provided between adjacent second lenses 4 in the image-scanning device 101 of the first embodiment. Alternatively, the configuration is such that, in the image-scanning device 104 shown in FIG. 11, a light-shielding wall 129 is provided between second mirror lenses for respective cells 13 in the second mirror lens array 124.

The light-shielding walls 129 are, as shown in the figures, plate-like elements and are disposed in the sub-scanning direction perpendicular to the main scanning direction. In the image-scanning device 104 shown in FIG. 11, each light-shielding wall 129 extends from a cell boundary of the second mirror lens array 124. In the image-scanning device 106 shown in FIG. 12, each light-shielding wall 129 extends equal lengths from the center of the second lens 4 toward the side of an aperture member array 5 and toward the side of an image pickup device 8. Note that in the image-scanning device 104 shown in FIG. 11 and the image-scanning device 106 shown in FIG. 12, the extending length of the light-shielding wall 129 is not limited to the above-described lengths.

Such light-shielding walls 129 act as follows.

In FIG. 12, an example of light ray tracing in a case where there are no light-shielding walls 129 is shown by reference numeral 20. Reference numeral 20 denotes a stray light ray. As shown in FIG. 12, the stray light rays 20 are light rays that get into their respective adjacent cells 13 at the location of the second lens array 4, despite the fact that they follow their normal optical paths at the first lens array 3. Such stray light rays 20 cause degradation in images and thus need to be eliminated.

Hence, as shown in FIG. 12, by providing the light-shielding walls 129, the stray light rays 20 that attempt to enter their respective adjacent cells 13 are shielded and can thereby be eliminated. Furthermore, since the light flux of the principal light rays that contribute to image formation are reduced in size at the location of the second lens array 4, even when the light-shielding walls 129 are mounted at boundaries between the second lenses 4, the light-shielding walls 129 do not shield the light flux of the principal light rays that contribute to image formation.

As described above, the light-shielding walls 129 can also be provided to the configuration of the reflective-type optical system such as the image-scanning device 104 shown in FIG. 11.

Therefore, according to the image-scanning device 106 of the sixth embodiment, the effects provided by the image-scanning device 101 of the first embodiment to the image-scanning device 104 of the fourth embodiment can be, of course, obtained and there also can be obtained an effect that by mounting the light-shielding walls 129 at the boundary portions between the cells 13 at the second lens array 4, only stray light can be effectively eliminated, thereby preventing degradation in images.

Note that by appropriately combining arbitrary embodiments from the above-described various embodiments, effects of the respective embodiments can be provided.

Although the present invention has been sufficiently described in relation to preferred embodiments thereof with reference to the accompanying drawings, various variations and modifications will be apparent to those skilled in the art. It should be understood that such variations and modifications may be incorporated in such embodiments without departing from the scope of the present invention which is defined by the appended claims.

The entire disclosed contents of description, drawings, claims, and abstract of Japanese Patent Application No. 2007-183925, filed Jul. 13, 2007 are incorporated herein by reference.

INDUSTRIAL APPLICABILITY

The present invention is applicable to an image-scanning device used in copiers, and the like.

The invention claimed is:

1. An image-scanning device characterized by comprising:
an illuminating device configured to illuminate an object being picked up which corresponds to an imaging target;
a plurality of image-forming optical systems configured to form images of the object being picked up;
an image pickup device configured to be located so as to correspond to the image-forming optical systems and to pickup the formed images; and
an image processing device configured to restore an original object being picked up from the images obtained by the image pickup device,
wherein the plurality of image-forming optical systems are arranged to be adjacent to each other in a main scanning direction with respect to the object being picked up, and form images of the object being picked up such that the object being picked up is inverted and reduced in size,
each of the image-forming optical systems includes a first optical element having a first focal length; an aperture member located at a focus position in a rear side of the first optical element; and a second optical element provided in a rear side of the aperture member and having a second focal length shorter than the first focal length, the first optical element, the aperture member, and the second optical element being disposed from a side of the object being picked up to a side of the image pickup device, and
in between two image-forming optical systems arranged to be adjacent to each other, the image pickup device includes a region in which the images picked up by the image pickup device are overlapped.

2. The image-scanning device according to claim 1, wherein each of the image-forming optical systems further includes a mirror disposed in an optical path traveling from the object being picked up to the image pickup device and configured to fold the optical path.

3. The image-scanning device according to claim 1, wherein the aperture member has a mirror at an opening of the aperture member, the mirror folding an optical path.

4. The image-scanning device according to claim 1, wherein at least one of the first optical element and the second optical element is a reflective-type mirror lens.

5. The image-scanning device according to claim 1, wherein at least one of the first optical element and the second optical element is molded into one piece between adjacent image-forming optical systems.

6. The image-scanning device according to claim 1, wherein the aperture member can be changed with an aperture member having an opening different in size.

7. The image-scanning device according to claim 1, wherein each of the image-forming optical systems further includes a light-shielding plate disposed between adjacent second optical elements.

8. The image-scanning device according to claim 1, wherein a size-reduction magnification is identical for all the image-forming optical systems and is 0.85 to 0.6×.

* * * * *